United States Patent
Izumi

(10) Patent No.: US 7,430,086 B2
(45) Date of Patent: Sep. 30, 2008

(54) DISCRETE TRACK RECORDING METHOD, STORAGE APPARATUS AND METHOD OF PRODUCING STORAGE APPARATUS

(75) Inventor: Haruhiko Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 27 days.

(21) Appl. No.: 11/484,540

(22) Filed: Jul. 11, 2006

(65) Prior Publication Data
US 2007/0201157 A1   Aug. 30, 2007

(30) Foreign Application Priority Data
Feb. 27, 2006   (JP) .............................. 2006-050790

(51) Int. Cl.
*G11B 5/02* (2006.01)
(52) U.S. Cl. ..................................... 360/55
(58) Field of Classification Search .................. None
See application file for complete search history.

(56) References Cited

U.S. PATENT DOCUMENTS 5,235,478 A * 8/1993 Hoshimi et al. ......... 360/77.08
5,285,341 A * 2/1994 Suzuki et al. ............... 360/121
6,768,605 B2 * 7/2004 Yamamoto .................. 360/69

FOREIGN PATENT DOCUMENTS

JP   2006-031756   2/2006

* cited by examiner

*Primary Examiner*—K. Wong
(74) *Attorney, Agent, or Firm*—Greer, Burns & Crain, Ltd.

(57) ABSTRACT

A discrete track recording method records information on a magnetic recording medium having mutually adjacent tracks that are separated in advance by a groove. The discrete track recording method carries out a recording using a recording head having a core width in a range greater than or equal to a first value CW1 and less than a second value CW2 satisfying CW1<CW2 with respect to a first magnetic recording medium having a first track pitch TP1, and carries out a recording a recording head having a core width in a range greater than or equal to the second value CW2 and less than a third value CW3 satisfying CW2<CW3 with respect to a second magnetic recording medium having a second track pitch TP2 satisfying TP1<TP2.

17 Claims, 8 Drawing Sheets

TRACK 422

TRACK 322
GROOVE 323
TRACK PITCH TP

DISCRETE TRACK RECORDING METHOD, STORAGE APPARATUS AND METHOD OF PRODUCING STORAGE APPARATUS

BACKGROUND OF THE INVENTION

1. Field of the Invention

The present invention generally relates to discrete track recording methods, storage apparatuses and methods of producing storage apparatuses, and more particularly to a discrete track recording method for recording information on a magnetic recording medium having discrete tracks, a storage apparatus which employs such a discrete track recording method, and a method of producing such a storage apparatus.

2. Description of the Related Art

In storage apparatuses such as magnetic disk apparatuses (hereinafter simply referred to as magnetic disk drives), there are demands to improve the recording density of a magnetic disk and to realize an apparatus having a large storage capacity. The magnetic recording system employed in such storage apparatuses include the longitudinal magnetic recording system and the perpendicular magnetic recording system.

In order to improve the recording density on the magnetic disk, it is necessary to increase the track density. However, when the track density is increased to a high value, the writing that spreads at the time of the recording may affect an adjacent track and generate the so-called cross writing. When the cross writing occurs, a partial overwrite may be made with respect to information that is already recorded on the adjacent track, for example, and it becomes impossible in this case to guarantee a normal recording of the information.

On the other hand, in order to increase the track density to the high value, it is necessary to produce a recording head having an extremely narrow core width. However, when the core width of the recording head is extremely narrow, the inconsistencies in the core widths of the individual recording heads, generated due to inconsistencies introduced during the production process, become notable relatively. For example, even in the case of a magnetic disk that can realize a storage capacity SCA by using a recording head with a core width CWA, it is only possible to realize a storage capacity SCB (<SCA) by using a recording head with a core width CWB (>CWA).

Accordingly, if the designed value of the core width of the recording heads to be produced is CW but the recording heads that are actually produced have the core widths CWA and CWB due to the inconsistencies introduced during the production process, the storage capacity of the magnetic disk drive becomes different even when the same magnetic disk is used depending on the core width CWA or CWB of the recording head that is combined with the magnetic disk. In addition, if the actual core width of the recording head is considerably wider than the designed value, the effects of the cross writing become particularly notable.

For example, a Japanese Laid-Open Patent Application No.2006-31756 proposes a magnetic disk having discrete tracks in order to prevent the cross writing. Since a groove is provided between two mutually adjacent discrete tracks on the magnetic disk, it is possible to suppress the generation of the cross writing.

In order to further improve the track density of the magnetic disk having the discrete tracks, it is necessary to further reduce the core width of the recording head to a narrow value. However, as the core width becomes narrower, the inconsistencies introduced during the production process become more notable relatively. Further, because a track pitch of the magnetic disk having the discrete tracks is prescribed by separating the discrete tracks on which the information is recorded by the groove, the writing that spreads may reach the adjacent track and generate the cross writing if the core width is even wider than a predetermined core width (tolerable maximum core width) which is wider than the designed value (that is, too wide), and the writing that spreads may appear within the recording track and make it impossible to record the information in a positively readable manner if the core width is even narrower than a predetermined core width (tolerable minimum core width) which is narrower than the designed value (that is, too narrow). Moreover, if an attempt is made to reduce the effects of the core widths that are inconsistent by increasing the groove width, the recording track width is reduced by a corresponding amount, and it becomes impossible to secure a sufficiently large recording region on the magnetic disk. Hence, unless the inconsistencies of the core width of the recording head, caused by the inconsistencies introduced during the production process, are suppressed, it is difficult to further improve the track density.

According to the conventional magnetic disk having the discrete tracks, the groove is provided in advance at a constant pitch, and thus, the tracks that are separated by the groove are also formed in advance at a constant pitch. The recording head is produced to have the core width which is the designed value matching the constant track pitch. However, the actual core width differs among the individual recording heads due to the inconsistencies introduced during the production process, and the recording heads that are actually produced include recording heads having a core width wider than the designed value and recording heads having a core width narrower than the designed value.

For this reason, the recording head having the core width that is wider than the tolerable maximum core width and the recording head having the core width that is narrower than the tolerable minimum core width cannot be mounted in the magnetic disk drive, thereby making the production yield of the magnetic disk drive low.

On the other hand, if an attempt is made to improve the production yield of the magnetic disk drive by increasing the value of the tolerable maximum core width so as to increase the range of the core width of the recording head that can be mounted in the magnetic disk drive, it becomes necessary to increase the track pitch, and the track density is consequently reduced.

Therefore, in the conventional magnetic disk having the discrete tracks, there was a problem in that it is impossible to simultaneously improve the production yield of the magnetic disk drive and improve the track density of the magnetic disk.

SUMMARY OF THE INVENTION

Accordingly, it is a general object of the present invention to provide a novel and useful discrete track recording method, storage apparatus and method of producing storage apparatus, in which the problems described above are suppressed.

Another and more specific object of the present invention is to provide a discrete track recording method, a storage apparatus and a method of producing storage apparatus, which can simultaneously improve the production yield of the storage apparatus such as the magnetic disk drive and improve the track density of the magnetic recording medium such as the magnetic disk.

Still another object of the present invention is to provide a discrete track recording method for recording information on a magnetic recording medium having mutually adjacent tracks that are separated in advance by a groove, comprising carrying out a recording using a recording head having a core width in a range greater than or equal to a first value CW1 and less than a second value CW2 with respect to a first magnetic recording medium having a first track pitch TP1, where CW1<CW2; and carrying out a recording a recording head having a core width in a range greater than or equal to the second value CW2 and less than a third value CW3 with respect to a second magnetic recording medium having a second track pitch TP2, where CW2<CW3 and TP1<TP2. According to the discrete track recording method of the present invention, it is possible to simultaneously improve the production yield of the storage apparatus and improve the track density of the magnetic recording medium.

A further object of the present invention is to provide a storage apparatus for recording information on a magnetic recording medium having mutually adjacent tracks that are separated in advance by a groove, comprising a first recording head, having a core width in a range greater than or equal to a first value CW1 and less than a second value CW2, configured to carry out a recording with respect to a first magnetic recording medium having a first track pitch TP1, where CW1<CW2; and a second recording head, having a core width in a range greater than or equal to the second value CW2 and less than a third value CW3, configured to carry out a recording with respect to a second magnetic recording medium having a second track pitch TP2, where CW2<CW3 and TP1<TP2. According to the storage apparatus of the present invention, it is possible to simultaneously improve the production yield of the storage apparatus and improve the track density of the magnetic recording medium.

Another object of the present invention is to provide a method of producing a storage apparatus for recording information on a magnetic recording medium having mutually adjacent tracks that are separated in advance by a groove, comprising installing in the storage apparatus a recording head, having a core width in a range greater than or equal to a first value CW1 and less than a second value CW2, in combination with a first magnetic recording medium having a first track pitch TP1, where CW1<CW2; and installing in the storage apparatus a recording head, having a core width in a range greater than or equal to the second value CW2 and less than a third value CW3, in combination with a second magnetic recording medium having a second track pitch TP2, where CW2<CW3 and TP1<TP2. According to the method of producing the storage apparatus of the present invention, it is possible to simultaneously improve the production yield of the storage apparatus and improve the track density of the magnetic recording medium.

Other objects and further features of the present invention will be apparent from the following detailed description when read in conjunction with the accompanying drawings.

DESCRIPTION OF THE PREFERRED EMBODIMENTS

Figure 1:
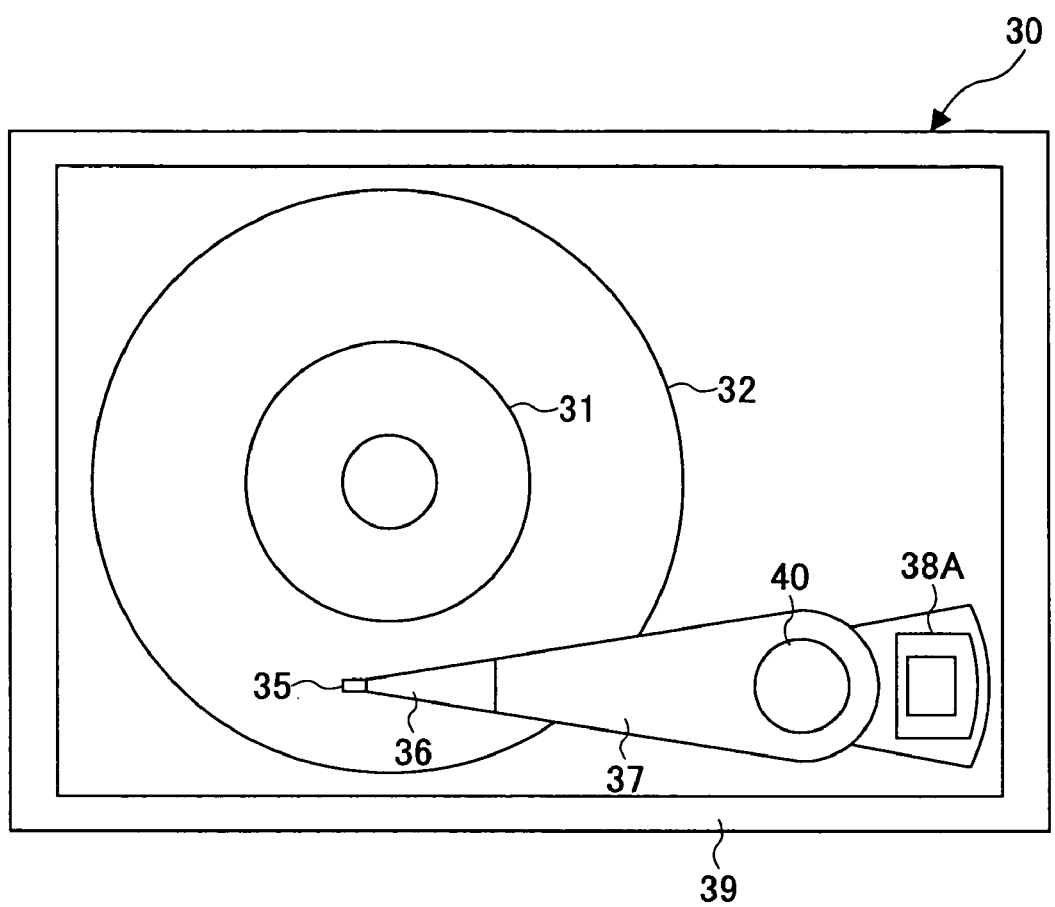
FIG. 1 is a plan view showing an embodiment of a storage apparatus according to the present invention.

In the present invention, when recording information on a magnetic recording medium having mutually adjacent tracks that are separated in advance by a groove, the recording is made using a recording head having a core width in a range greater than or equal to a first value CW1 and less than a second value CW2 (where CW1<CW2) with respect to a first magnetic recording medium having a first track pitch TP1, and the recording is made using a recording head having a core width in a range greater than or equal to the second value CW2 and less than a third value CW3 (where CW2<CW3) with respect to a second magnetic recording medium having a second track pitch TP2 (where TP1<TP2).

For example, the first value CW1 is the tolerable minimum core width of the recording head, and the third value CW3 is the tolerable maximum core width of the recording head.

Even when the actual core width of the recording head differs from a designed value CWD (where CW1<CWD<CW2) due to inconsistencies introduced during the production process, the recording head can be combined with a magnetic recording medium having a track pitch that is in accordance with the actual core width. Hence, it is possible to effectively utilize the recording head having the core width with a production error that is within a larger tolerable range than that of the conventional case. In addition, by combining the recording head with the magnetic recording medium having the suitable track pitch, it is possible to realize a track density in accordance with the core width of each recording head so as not to be affected by the writing that spreads. As a result, it is possible to simultaneously improve the production yield of the magnetic disk drive and improve the track density.

A description will now be given of embodiments of a discrete track recording method, a storage apparatus and a method of producing storage apparatus, by referring to the drawings.

FIG. 1 is a plan view showing an embodiment of the storage apparatus according to the present invention. In this embodiment of the storage apparatus, the present invention is applied to a perpendicular magnetic disk drive that employs the perpendicular magnetic recording system. It is assumed for the sake of convenience that this embodiment of the storage apparatus employs an embodiment of a discrete track recording method according to the present invention and is produced by an embodiment of the method of producing the storage apparatus according to the present invention.

A perpendicular magnetic disk drive 1 shown in FIG. 1 has a spindle 31, a magnetic disk 32, a head 35, a support spring mechanism 36, a head arm 37, a rotor coil 38 and a rotary shaft 40 that are provided within a housing 39. The basic structure itself of this perpendicular magnetic disk drive 1 may be a known basic structure. In this embodiment, a plurality of magnetic disks 32 are provided within the housing 39, and thus, a corresponding number of heads 35, head arms 37 and the like are provided within the housing 39 in accordance with the number of heads 35 that are provided.

The magnetic disk 32 is rotated by a spindle motor (not shown) that drives the spindle 31. The head 35 that records information on and reproduces information from the magnetic disk 32 is mounted on the support spring mechanism 36 which is provided on the head arm 37. The head arm 37 is turned about the rotary shaft 40 by a voice coil motor (VCM) which is formed by the rotor coil 38 and a fixed magnetic circuit (not shown), and the head 35 is positioned on a recording track on the magnetic disk 32 to record information on and reproduce information from the recording track.

Figure 2A:
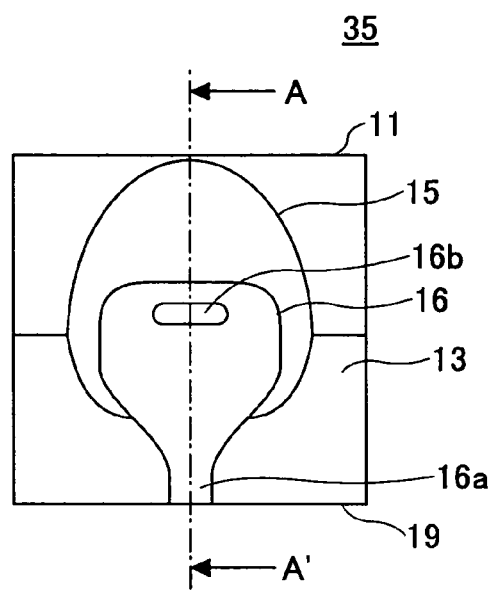
FIGS. 2A and 2B are diagrams showing a structure of a recording head portion of a head.
Figure 2B:
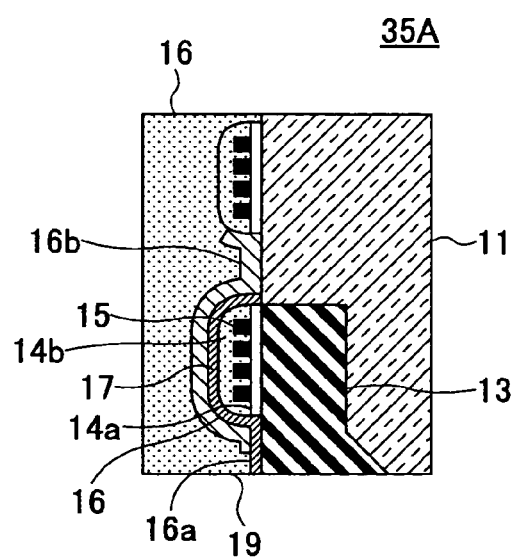

FIGS. 2A and 2B are diagrams showing a structure of a recording head portion of the head 35. FIG. 2A shows a front view of the recording head, and FIG. 2B shows a cross section taken along a one-dot chain line A-A' in FIG. 2A.

As shown in FIGS. 2A and 2B, a recording head 35A has a magnetic substrate 11, a nonmagnetic insulator material 13 embedded in a portion of the magnetic substrate 11, and an interlayer insulator 14a, a thin film coil 15 and an interlayer insulator 14b that are successively formed on the nonmagnetic insulator material 13. A main pole 16 is formed on the interlayer insulator 14a, and a tip end portion 16a of the main pole 16 functions as a core which confronts the magnetic disk 32 and records the information on the recording track. A rear end portion 16b of the main pole 16 is formed to make contact with the magnetic substrate 11 and to form the magnetic circuit. A magnetic overlayer 17 is formed on the main pole 16 to increase the magnetic efficiency, and this magnetic overlayer 17 is covered by a protection layer 18.

When a current which inverts depending on the recording information is applied to the thin film coil 15, a strong magnetic field is generated from the core (the tip end portion 16a of the main pole 16), and magnetic domains in accordance with the recording information is recorded on a recording layer of the magnetic disk 32. A width of the magnetic domains recorded on the recording track of the magnetic disk 32 is determined by the core width of the recording head 35A, that is, the width of the tip end portion 16a shown in FIG. 2A.

Figure 3:
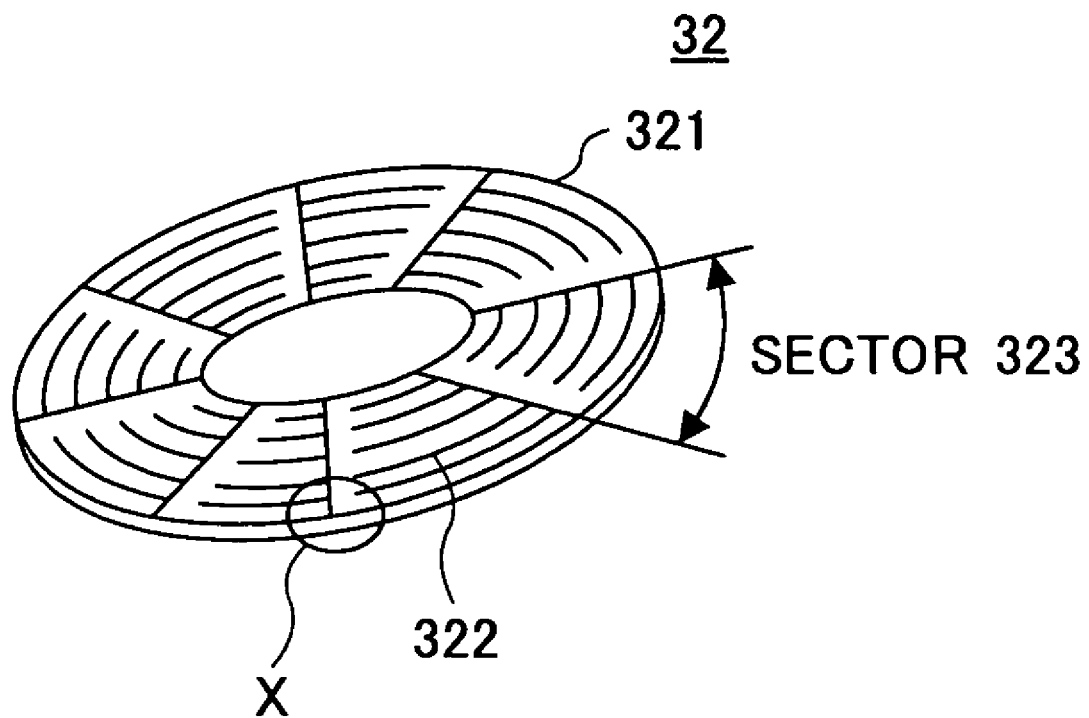
FIG. 3 is a perspective view showing a magnetic disk.
Figure 4:
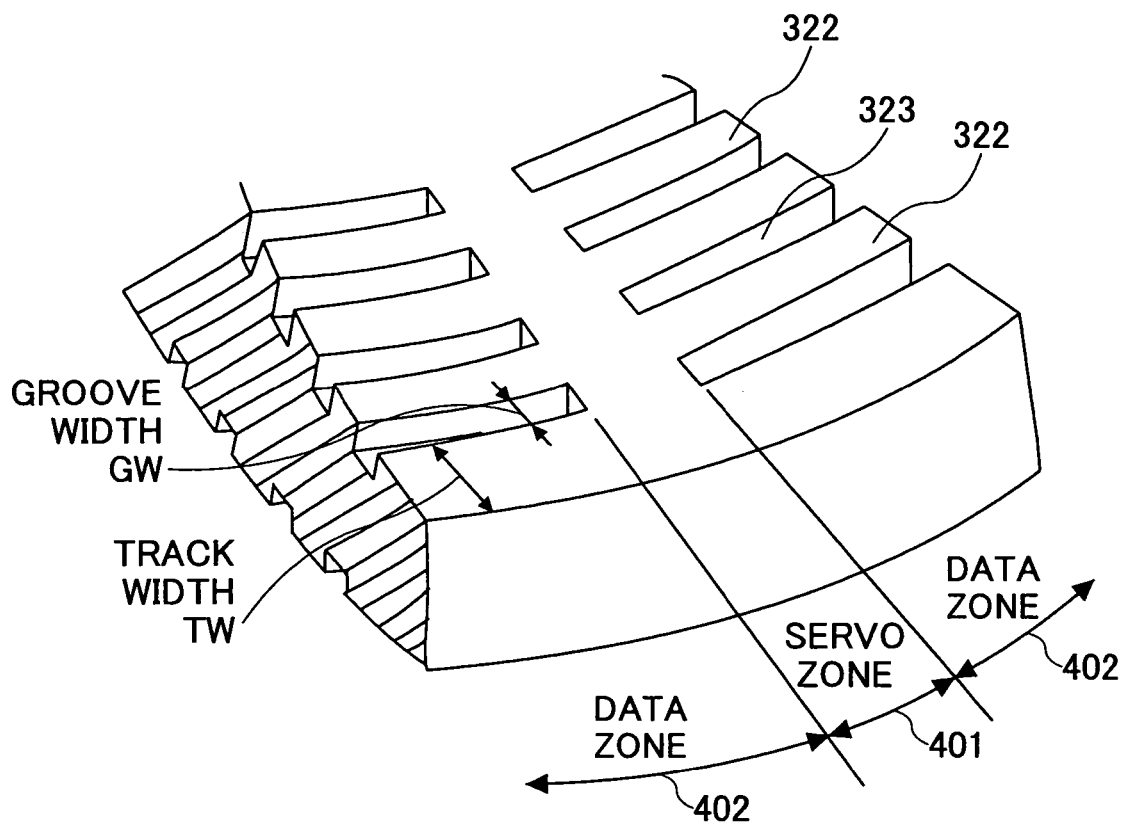
FIG. 4 is a perspective view showing a portion of the magnetic disk shown in FIG. 3 on an enlarged scale.

FIGS. 3 and 4 are diagrams for explaining the magnetic disk 32. FIG. 3 is a perspective view showing the magnetic disk 32, and FIG. 4 is a perspective view showing a portion X of the magnetic disk 32 shown in FIG. 3 on an enlarged scale.

As shown in FIG. 3, a plurality of concentric discrete tracks 322 are formed on a recording surface 321 of the magnetic disk 32. The recording surface 321 is sectioned into a plurality of radial or fan-shaped sectors 323. A spiral track may be provided in place of the concentric tracks 322, and in this case, one track 322 (one track turn) is formed in one revolution of the magnetic disk 32.

As shown on the enlarged scale in FIG. 4, two mutually adjacent tracks along a radial direction of the magnetic disk 32 are separated by a groove 324. In this embodiment, the groove 324 is not formed in a servo zone 401 provided in a header portion of each sector 323, however, the adjacent tracks 322 are separated by the groove 324 in a data zone 402 in which the information recording and information reproduction are made. Each track 322 has a track width TW, and the tracks 322 are provided at a constant pitch along the radial direction of the magnetic disk 32. Each groove 324 has a groove width GW, and the grooves 324 are provided at a constant pitch along the radial direction of the magnetic disk 32.

The groove 324 is formed to a depth that is at least equal to or less than a film thickness of the recording layer of the magnetic disk 32. In other words, the groove 324 may be formed to a predetermined depth of the recording layer or, to a depth exceeding the film thickness of the recording layer to separate the recording layer.

Figure 5:
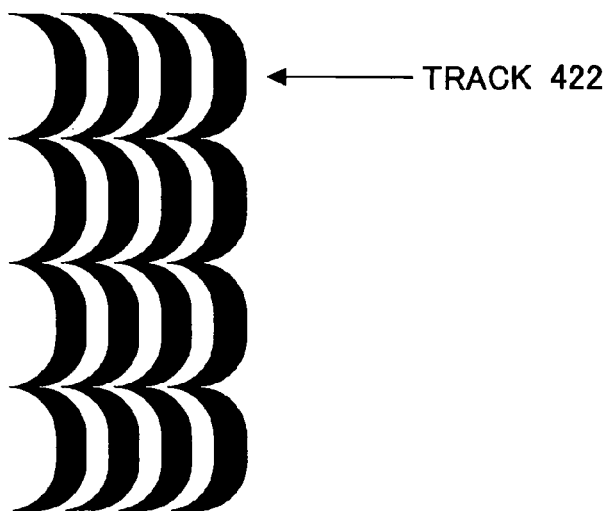
FIG. 5 is a diagram showing, for comparison purposes, an example of magnetic domains recorded on tracks in a case where a recording layer is a flat continuous layer.
Figure 6:
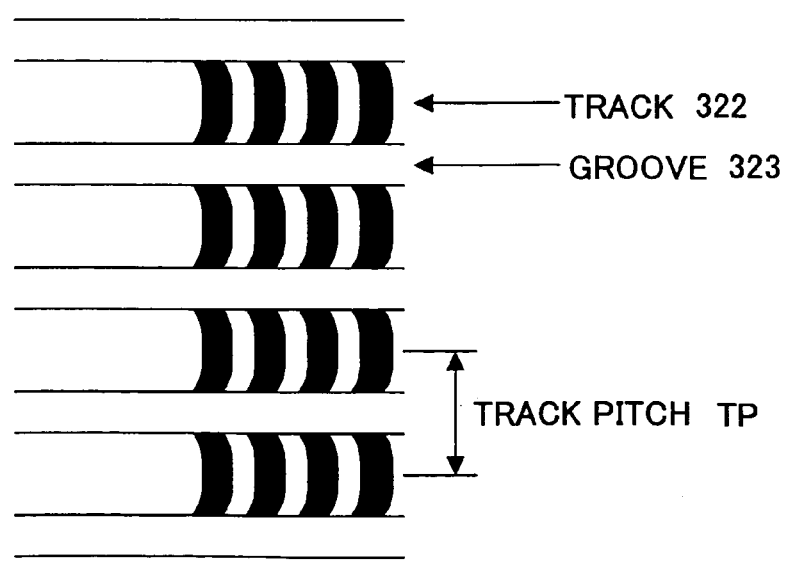
FIG. 6 is a diagram showing an example of magnetic domains recorded on tracks of the magnetic disk shown in FIGS. 3 and 4.

FIG. 5 is a diagram showing, for comparison purposes, an example of magnetic domains recorded on tracks 422 in a case where the recording layer is a flat continuous layer, that is, having no groove formed on the recording surface. FIG. 6 is a diagram showing an example of magnetic domains recorded on the tracks 322 of the magnetic disk 32 shown in FIGS. 3 and 4.

As may be seen from FIG. 5, in the case where the recording layer is the continuous layer, the writing that spreads occurs between the adjacent tracks 422 of the data zone when carrying out the recording. On the other hand, in the case where the adjacent tracks 322 of the data zone 402 are separated by the groove 323 as shown in FIG. 6, it is possible to suppress the effects of the writing that spreads, and improve the track density by a corresponding amount.

Although the recording head 35A is produced to have the core width with the designed value CWD, the actual core width differs for each of the individual recording heads 35A due to the inconsistencies introduced during the production process. Hence, the recording heads 35A that are actually produced include recording heads 35A having a core width wider than the designed value CWD and recording heads 35A having a core width narrower than the designed value CWD.

When recording information on the magnetic recording medium 32 having the mutually adjacent tracks 322 that are separated in advance by the groove 323 according to this embodiment of the discrete track recording method, the recording is made using a recording head 35A having a core width in a range greater than or equal to a first value CW1 and less than a second value CW2 (where CW1<CW2) with respect to a first magnetic recording medium 32 having a first track pitch TP1, and the recording is made using a recording head 35A having a core width in a range greater than or equal to the second value CW2 and less than a third value CW3 (where CW2<CW3) with respect to a second magnetic recording medium 32 having a second track pitch TP2 (where TP1<TP2). For example, the first value CW1 is the tolerable minimum core width of the recording head 35A, and the third value CW3 is the tolerable maximum core width of the recording head 35A.

Even when the actual core width of the recording head 35A differs from the designed value CWD (where CW1<CWD<CW2) due to the inconsistencies introduced during the production process, the recording head 35A can be combined with a magnetic recording medium 32 having a track pitch TP that is in accordance with the actual core width. Hence, it is possible to effectively utilize the recording head 35A having the core width with a production error that is within a larger tolerable range than that of the conventional case. In addition, by combining the recording head 35A with the magnetic recording medium 32 having the suitable track pitch TP, it is possible to realize a track density in accordance with the core width of each recording head 35A so as not to be affected by the writing that spreads. As a result, it is possible to simultaneously improve the production yield of the magnetic disk drive 30 and improve the track density.

According to this embodiment of the method of producing the storage apparatus, the first magnetic disk 32 and the second magnetic disk 32 described above, having the different track pitches TP, are prepared in advance. If the actual core width of the recording head 35A is within the range greater than or equal to the first value CW1 and less than the third value CW3, the recording head 35A is combined with the magnetic disk 32 having the track pitch TP in accordance with the core width thereof and installed in the magnetic disk drive 30, so as to improve the production yield of the recording head 35A and the magnetic disk drive 30.

The core width of the recording head 35A can be measured by a known method. For example, information may actually be recorded on the magnetic disk using the recording head 35A that is produced, and a reproducing head may scan this magnetic disk in the radial direction so as to obtain the core width from an amplitude of the reproduced signal.

The magnetic disk drive 30 of this embodiment includes at least one combination of the first magnetic disk 32 having the first track pitch TP1 and the recording head 35A having the core width within the range greater than or equal to the first value CW1 and less than the second value CW2, and at least one combination of the second magnetic disk 32 having the second track pitch TP2 and the recording head 35A having the core width within the range greater than or equal to the second value CW2 and less than the third value CW3. Of course, the magnetic disk drive 30 may only include a plurality of the combinations of the first magnetic disk 32 having the first track pitch TP1 and the recording head 35A having the core width within the range greater than or equal to the first value CW1 and less than the second value CW2 or, only include a plurality of the combinations of the second magnetic disk 32 having the second track pitch TP2 and the recording head 35A having the core width within the range greater than or equal to the second value CW2 and less than the third value CW3.

The groove widths GW of the grooves 323 of the first magnetic disk 32 and the grooves 323 of the second magnetic disk 32 may be the same or be mutually different. When the groove widths GW of the grooves 323 are set mutually different between the first and second magnetic disks 32, the groove widths GW may be set to be approximately proportional to the respective track pitches TP1 and TP2. In addition, the depths of the grooves 323 of the first and second magnetic disks 32 may be the same or be mutually different. When the simplicity of the production process is taken into consideration, it is desirable that the groove widths GW and the depths of the grooves 323 are both set to be the same for the first and second magnetic disks 32.

The magnetic disks 32 that are prepared in advance and have the different track pitches TP are not limited to the two kinds, namely, the first and second magnetic disks 32 described above, and it is of course possible to prepare three or more kinds of magnetic disks 32 in advance. For example, when three kinds of magnetic disks 32 are prepared in advance, a recording head 35A having a core width within a range greater than or equal to the third value CW3 and less than a fourth value CW4 (where CW3<CW4) is combined with a third magnetic disk 32 having a third track pitch TP3 (where TP2<TP3) and installed in the magnetic disk drive 30. In this case, the designed value CWD of the core width satisfies CW1<CWD<CW4.

Next, a description will be given of particular numerical examples of parameters such as the track pitch TP.

Figure 8:
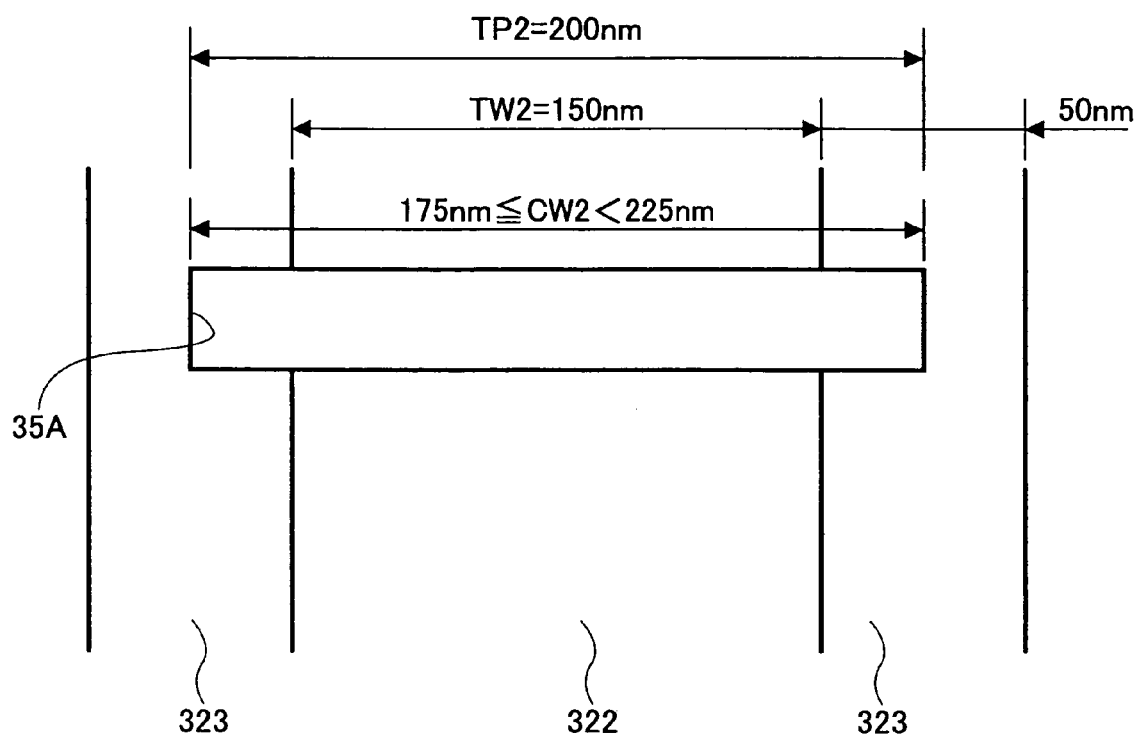
FIG. 8 is a diagram for explaining a combination of a second magnetic disk and the recording head.
Figure 9:
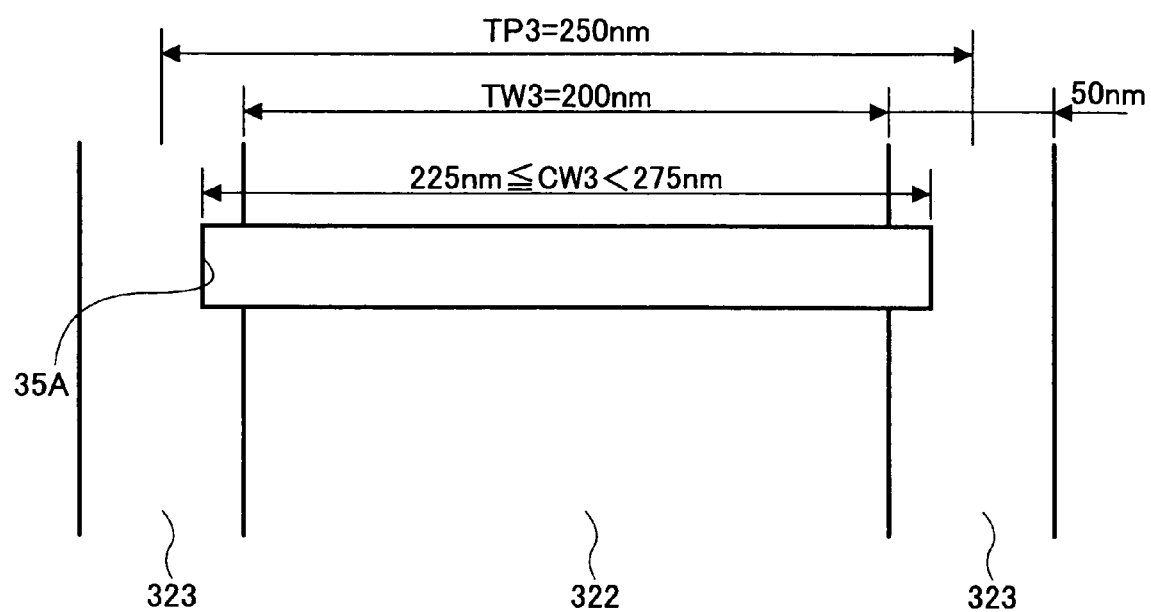
FIG. 9 is a diagram for explaining a combination of a third magnetic disk and the recording head.

In this embodiment, at least two kinds of magnetic disks 32 are prepared, as shown in FIGS. 8 and 9. The magnetic disk shown in FIG. 8 corresponds to the first magnetic disk 32 described above, and the magnetic disk shown in FIG. 9 corresponds to the second magnetic disk 32 described above.

Figure 7:
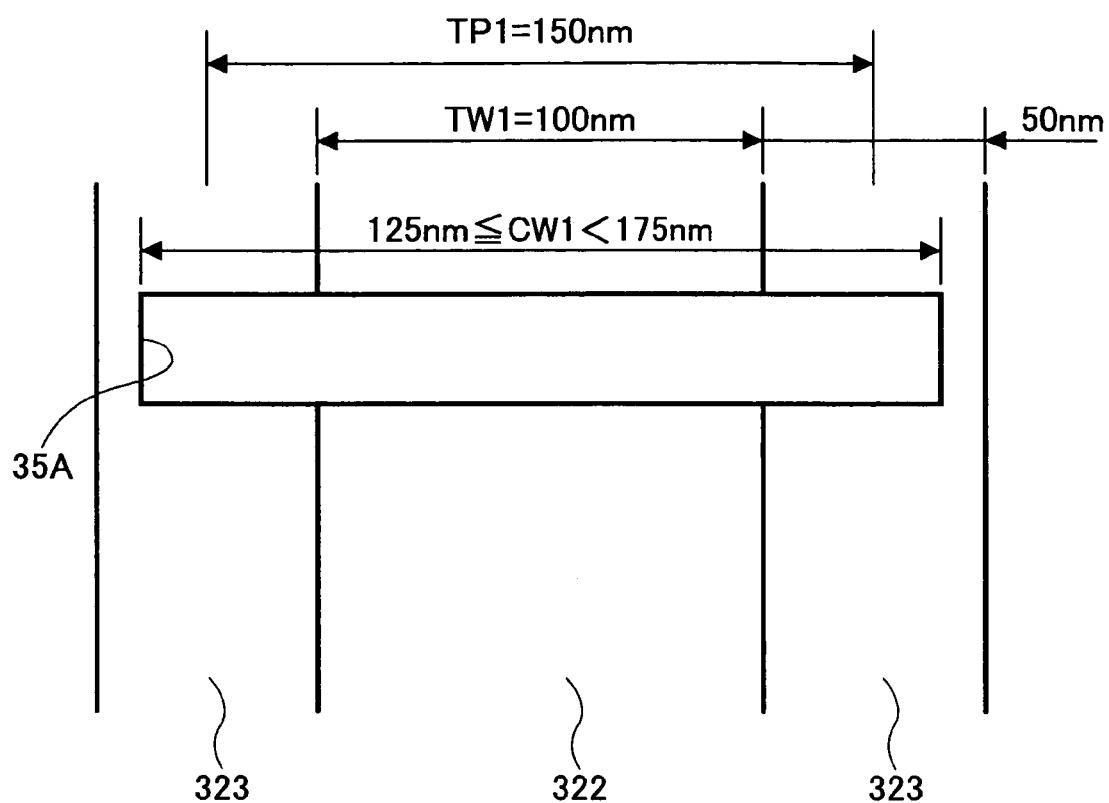
FIG. 7 is a diagram for explaining a combination of a first magnetic disk and a recording head.

FIG. 7 is a diagram for explaining a combination of the first magnetic disk 32 having a track density of 169 kTPI, the track pitch TP1=150 nm and the groove width GW=50 nm and the recording head 35A having the core width CW1=150 nm±25 nm.

FIG. 8 is a diagram for explaining a combination of the second magnetic disk 32 having a track density of 127 kTPI, the track pitch TP2=200 nm and the groove width GW=50 nm and the recording head 35A having the core width CW2=200 nm±25 nm.

FIG. 9 is a diagram for explaining a combination of the third magnetic disk 32 having a track density of 102 kTPI, the track pitch TP3=250 nm and the groove width GW=50 nm and the recording head 35A having the core width CW3=250 nm±25 nm.

Because the track pitch TP of the magnetic disk 32 having the discrete tracks 322 is prescribed by separating the discrete tracks 322 on which the information is recorded by the groove 323, the writing that spreads may reach the adjacent track 322 and generate the cross writing if the core width is even wider than a predetermined core width (tolerable maximum core width) which is wider than the designed value CWD (that is, too wide), and the writing that spreads may appear within the track 322 and make it impossible to record the information in a positively readable manner if the core width is even narrower than a predetermined core width (tolerable minimum core width) which is narrower than the designed value CWD (that is, too narrow). However, even if the designed value CWD of the core width CW of the recording head 35A is 200 nm and the production error of the core width CW is ±75 nm (3σ), for example, the recording head 35A may be combined with one of the first, second or third magnetic disk 32 having the track pitch TP which is in accordance with the actual core width CW so as to eliminate the above described problems related to the writing that spreads. Therefore, it is possible to simultaneously improve the production yield of the magnetic disk drive 30 and improve the track density.

When the groove width GW is set to be approximately proportional to the track pitch TP, a groove width GW1 of the first magnetic disk 32 shown in FIG. 8 may be set to 37.5 nm, for example, and a groove width GW3 of the third magnetic disk 32 shown in FIG. 10 may be set to 62.5 nm, for example.

This application claims the benefit of a Japanese Patent Application No.2006-050790 filed Feb. 27, 2006, in the Japanese Patent Office, the disclosure of which is hereby incorporated by reference.

Further, the present invention is not limited to these embodiments, but various variations and modifications may be made without departing from the scope of the present invention.

What is claimed is:

1. A discrete track recording method for recording information on a magnetic recording medium having mutually adjacent tracks that are separated in advance by a groove, comprising:
rotating a spindle;
carrying out a recording using a first recording head having a core width in a range greater than or equal to a first value CW1 and less than a second value CW2 with respect to a first magnetic recording medium fixed on the spindle and having a first track pitch TP1, where CW1<CW2; and
carrying out a recording using a second recording head having a core width in a range greater than or equal to the second value CW2 and less than a third value CW3 with respect to a second magnetic recording medium fixed on the spindle and having a second track pitch TP2, where CW2<CW3 and TP1<TP2.

2. The discrete track recording method as claimed in claim 1, wherein the first and second recording heads are produced to have a core width with a constant designed value CWD but have different core widths due to inconsistencies introduced during a production process, where CW1<CWD<CW2.

3. The discrete track recording method as claimed in claim 1, wherein a groove width of the groove of the first magnetic recording medium and a groove width of the groove of the second magnetic recording medium are mutually different.

4. A storage apparatus for recording information on a magnetic recording medium having mutually adjacent tracks that are separated in advance by a groove, comprising:
- a spindle;
- a first magnetic recording medium fixed on the spindle and having a first track pitch TP1;
- a first recording head, having a core width in a range greater than or equal to a first value CW1 and less than a second value CW2, configured to carry out a recording with respect to the first magnetic recording medium, where CW1<CW2;
- a second magnetic recording medium fixed on the spindle and having a second track pitch TP2; and
- a second recording head, having a core width in a range greater than or equal to the second value CW2 and less than a third value CW3, configured to carry out a recording with respect to the second magnetic recording medium, where CW2<CW3 and TP1<TP2.

5. The storage apparatus as claimed in claim 4, wherein the groove is formed in a recording layer of each of the first and second magnetic recording media to a depth which is at least less than or equal to a film thickness of the recording layer.

6. The storage apparatus as claimed in claim 4, wherein a groove width of the groove of the first magnetic recording medium and a groove width of the groove of the second magnetic recording medium are mutually different.

7. The storage apparatus as claimed in claim 4, wherein each of the first and second magnetic recording media employs a perpendicular magnetic recording system.

8. A method of producing a storage apparatus for recording information on a magnetic recording medium having mutually adjacent tracks that are separated in advance by a groove, comprising:
- installing in the storage apparatus a first recording head, having a core width in a range greater than or equal to a first value CW1 and less than a second value CW2, in combination with a first magnetic recording medium having a first track pitch TP1, where CW1<CW2; and
- installing in the storage apparatus a second recording head, having a core width in a range greater than or equal to the second value CW2 and less than a third value CW3, in combination with a second magnetic recording medium having a second track pitch TP2, where CW2<CW3 and TP1<TP2.

9. The method of producing the storage apparatus as claimed in claim 8, wherein the first and second recording heads are produced to have a core width with a constant designed value CWD but have different core widths due to inconsistencies introduced during a production process, where CW1<CWD<CW2.

10. The method of producing the storage apparatus as claimed in claim 8, wherein a groove width of the groove of the first magnetic recording medium and a groove width of the groove of the second magnetic recording medium are mutually different.

11. The method of producing the storage apparatus as claimed in claim 8, comprising:
- installing only one of a combination of the first recording head and the first magnetic recording medium and a combination of the second recording head and the second magnetic recording medium.

12. The method of producing the storage apparatus as claimed in claim 8, comprising:
- installing both a combination of the first recording head and the first magnetic recording medium and a combination of the second recording head and the second magnetic recording medium.

13. The method of producing the storage apparatus as claimed in claim 8, comprising:
- installing in the storage apparatus a third recording head, having a core width in a range greater than or equal to the third value CW3 and less than a fourth value CW4, in combination with a third magnetic recording medium having a third track pitch TP3, where CW3<CW4 and TP2<TP3,
- said third magnetic recording medium being different from the first and second magnetic recording media.

14. The method of producing the storage apparatus as claimed in claim 8, wherein each of the first and second magnetic recording media employs a perpendicular magnetic recording system.

15. A method of producing a storage apparatus, comprising:
- measuring a core width of a recording head; and
- installing in the storage apparatus the recording head in combination with a discrete track recording medium having mutually adjacent tracks separated in advance by a groove with a track pitch corresponding to the core width of the recording head.

16. The method of producing the storage apparatus as claimed in claim 15, wherein a first recording head having a core width in a range greater than or equal to CW1 and less than CW2 is installed in combination with a first recording medium having a track pitch TP1, and a second recording head having a core width in a range greater than or equal to CW2 and less than CW3 is installed in combination with a second magnetic recording medium having a track pitch TP2, where CW2<CW3 and TP1<TP2.

17. The method of producing the storage apparatus as claimed in claim 16, wherein first and second recording heads are produced to have a core width with a constant designed value CWD but have different core widths due to inconsistencies introduced during a production process, where CW1<CWD<CW2.

* * * * *